United States Patent [19]
Dijkstra et al.
[11] Patent Number: 4,698,185
[45] Date of Patent: Oct. 6, 1987

[54] PROCESS FOR PRODUCING DEGUMMED VEGETABLE OILS AND GUMS OF HIGH PHOSPHATIDIC ACID CONTENT

[75] Inventors: Albert J. Dijkstra, Kortrijk; Martin Van Opstal, Izegem, both of Belgium

[73] Assignee: Safinco Coordination Center N.V., Kortrijk, Belgium

[21] Appl. No.: 839,286

[22] Filed: Mar. 13, 1986

[30] Foreign Application Priority Data

Mar. 18, 1985 [GB] United Kingdom ................ 8506907

[51] Int. Cl.[4] ............................................ C07F 9/10
[52] U.S. Cl. ............................................ 260/403
[58] Field of Search ............................................ 260/403

[56] References Cited

U.S. PATENT DOCUMENTS 2,702,813 2/1955 Sullivan ............................ 260/403
3,505,074 4/1970 Pardum ............................ 260/403

*Primary Examiner*—Anton H. Sutto
*Attorney, Agent, or Firm*—Cushman, Darby & Cushman

[57] ABSTRACT

A process for producing at the same time degummed vegetable oils and gums of high phosphatidic acid content is described. The starting materials for this process are vegetable oils which have been conventionally water degummed and accordingly still contain too much non-hydratable phosphatides and iron for further processing by physical refining and providing a refined oil of good keepability. Therefore in a first stage of the disclosed process a non-toxic aqueous acid, e.g. phosphoric acid, is finely dispersed in the water degummed oil and sufficient contact time is allowed to complete the decomposition of the metal salts of phosphatidic acid. In a second stage a base is added to increase the pH above 2.5 without substantial formation of soap and in a third stage the aqueous phase containing the gums and the oil phase are separated. Surprisingly this process not only results in a degummed oil with very low phosphorus and iron contents which make the oil suitable for physical refining but also provides gums of high phosphatidic acid content with improved usability.

15 Claims, No Drawings

PROCESS FOR PRODUCING DEGUMMED VEGETABLE OILS AND GUMS OF HIGH PHOSPHATIDIC ACID CONTENT

BACKGROUND OF INVENTION

The invention relates to a process for producing degummed vegetable oils and gums of high phosphatidic acid content by removing non-hydratable phosphatides and iron from water degummed vegetable oils and the oils and the high phosphatidic acid gums obtained by this process. More particularly the invention relates to a process which yields an oil that can be physically refined and a gum having good emulsifying properties.

Crude vegetable oils as obtained by pressing and/or extracting oil seeds contain several compounds other than triglycerides. Some of these, such as diglycerides, tocopherols, sterols and sterol esters need not necessarily be removed during refining but other compounds such as phosphatides, free fatty acids, odours, colouring matter, waxes and metal compounds must be removed because they disadvantageously affect taste, smell, appearance and keepability of the refined oil.

Several unit operations exist for the removal of these unwanted compounds, the conventional water degumming-process being the first one. During this process water or steam (e.g. 3% water for soybean oil) is added to hot crude oil (e.g. 70° C.) as a result of which a gum layer is formed (e.g. after a contact time of about 5 minutes) which is separated from the oil (e.g. by centrifuging) and processed into commercial lecithin. The resulting water degummed oil thus has a considerably lower phosphorus content than the crude oil but still contains phosphatides, the so-called non-hydratable phosphatides (NHP), the presence of which is considered to be undesirable in fully refined oil.

These NHP are commonly removed during alkali refining. This unit operation comprises the dispersion of an acid, e.g. phosphoric acid in water degummed oil (or crude oil), the addition of slight excess of caustic soda liquor and the separation of the soaps thus formed. The soapstock thus obtained contains the free fatty acids originally present in the crude or water degummed oil, some triglyceride oil and the NHP and other mucilaginous compounds such as sucrolipids and lipoproteins. This soapstock therefore has to be split prior to disposal both to recover fatty acids contained therein and to obtain a less polluting effluent. Nevertheless, because of the presence of organic residues resulting from triglyceride oils, NHP and other mucilaginous compounds this effluent can still pose disposal problems requiring an often costly solution.

The alkali refined, so-called neutral oil is then bleached by heating under reduced pressure with bleaching earth which is subsequently removed by filtration. Some triglyceride oil adheres to the bleaching earth and this constitutes a refining loss. For this reason as well as to minimize disposal problems of spent bleaching earth, its usage level is kept as low as possible.

Finally, volatile compounds are removed from the bleached oil by steam stripping under vacuum during the deodorisation process. If the main purpose of this unit operation is the removal of free fatty acids, it is commonly referred to as physical refining.

Physical refining has a number of advantages over alkali refining, the main advantage being the avoidance of soapstock formation. A second advantage is the potentially lower refining loss because it avoids the saponification of oil and oil entrainment by the soaps as encountered during alkali refining. If, on the other hand more bleaching earth has to be used prior to physical refining than is required prior to deodorisation, this advantage may be more than offset.

Accordingly, physical refining tends to have economic advantages over alkali refining for oils with a high free fatty acid content such as palm oil, but there is another reason why oils such as soy bean oil, sunflower seed oil etc. are not commonly physically refined: the oils to be physically refined must be free from NHP in order to yield stable fully refined oils and the water degumming process does not remove NHP.

Consequently, a number of processes have been described that provide a clean, NHP-free feedstock for physical refining. In Dutch patent application No. 78 04829, a process is described that is concerned with physical refining of soy bean oil. It requires that the flaked soy beans be wetted and heated prior to being extracted. Oil extracted from such flakes shows a very low NHP-content after water degumming and is amenable to physical refining and thus yields a stable oil. Oil yield on extraction is, however, somewhat decreased, energy requirement during extraction is increased and although lecithin yield is considerably increased, the lecithin composition is changed (M. Kock, Fette, Seifen und Anstrichmittel 83, 552 (1981), Table 8).

Another process is described in DE-AS No. 26 09 705. In this process, water degummed oil is treated with an acid and cooled to below 40° C. whereupon the NHP's form gums in a form that can be removed. In the specification it is noted that less acid is required if a crude oil is used instead of a water degummed oil, which discovery has led to another process as described in East German Patent No. 132 877 in which process lecithin is added to water degummed oil to facilitate the NHP removal.

This same discovery also forms the basis of British Patent No. 1 565 569 where a single separation degumming process for triglyceride oils is described, as part of the crushing operation. In this process an acid is added to a crude oil and allowed to contact the oil for a period of approximately 10 minutes for reaction whereupon this acid is at least partially neutralized by a base, an extended contact time being allowed for the development of a gum layer which is then separated without the need to cool. The gums thus obtained are not commercialized as such but passed to the meal desolventiser in a solvent extraction plant or added to the meal being pelleted.

As mentioned before crude vegetable oils besides other undesirable components contain metal compounds, the most usual metals being calcium, potassium, magnesium, aluminum, iron and copper. These metal impurities form salts of phosphatidic acid in the non-hydratable phosphatides, NHP. Further the metals are present as soap and are bound to other accompanying lipids. Metal contaminants and especially iron may cause darkening of the oil during deodorisation and even small amounts of iron which do not infringe the colour of the oil severely reduce the stability of the finished oil. Thus besides the removal of non-hydratable phosphatides also the removal of metal contaminants and especially iron is highly desirable in an economical degumming process. However, known processes usually only lead to a quite unsatisfactory reduction of the metal contents and especially the iron contents of the degummed oil.

OBJECTS OF THE INVENTION

Therefore it is an object of this invention to provide a process for producing degummed vegetable oils which can be carried out within comparatively short periods of time and results in satisfactory removal of non-hydratable phosphatides and iron from water-degummed vegetable oils.

It is a further object of this invention to provide a process for producing gum of high phosphatidic acid content with improved usability.

It is a further object of this invention to provide a process for producing degummed vegetable oils and gums of high phosphatidic acid content in which water degummed oils are used as starting material so that any loss of desired lecithin obtained by conventional water degumming is avoided.

It is a further object of this invention to provide a process for producing degummed vegetable oils suitable for physical refining.

It is a further object of this invention to provide for gums of high phosphatidic acid content exhibiting interesting emulsifying properties.

These and further objects will become apparent as the description of the invention proceeds.

DETAILED DESCRIPTION OF INVENTION

The invention is directed to a process for producing degummed vegetable oils and gums of high phosphatidic acid content and the products obtained by this process as described herein and in the dependent claims.

The process according to the invention is a process for producing degummed vegetable oils and gums of high phosphatidic acid content by removing non-hydratable phosphatides and iron from water degummed vegetable oils comprising the following stages:

(a) In a first stage a non-toxic aqueous acid is finely dispersed in the water degummed oil whereby the degree of dispersion is at least such that 10 million droplets aqueous acid per gram of oil are present and a sufficient contact time is allowed to complete the decomposition of the metal salts of phosphatidic acid;

(b) in a second stage a base is mixed into the acid-in-oil dispersion in such quantity that the pH of the aqueous phase is increased to above 2.5 but no substantial amount of soap is produced; and (c) in a third stage the dispersion is separated into an aqueous phase containing the gums and an oil phase consisting of acid oil, and the oil phase is optionally washed with water.

It has surprisingly been found that it is not necessary that hydratable phosphatides are present in the oil to which the acid is added and that water degummed oil containing only NHP can be used without the need to cool provided that the acid is sufficiently finely dispersed in the oil. Similarly it has not been found necessary to introduce an extended contact time after the base addition.

In addition it has been found that the phosphatides isolated from water degummed oil exhibit a higher phosphatidic acid content than normal commercial lecithin as obtained by water degumming, e.g. crude soy bean oil, and exhibit interesting emulsifying properties.

The gums isolated in the third stage of the process according to the invention can be processed in a number of ways into phosphatide/oil mixtures with a higher phosphatidic acid content than is observed in commercial lecithin. It is also possible to convert the phosphatidic acid into more stable salts, e.g. ammonium salts.

Such phosphatidic acid containing mixtures have been found to possess specific emulsifying properties which make them eminently suitable for certain applications as for instance calf milk replacers; besides, they have the advantage of being completely natural. Instead of having to be incorporated in meal and to be exploited at meal value, the gums resulting from the process according to the invention have a considerably higher value as a result of which they greatly improve the economics of the process.

The removal of NHP from water degummed oil according to the third stage of the process of the invention leads to such low residual phosphorus levels (below 10 ppm and regularly below 5 ppm) that the amount of bleaching earth to be used prior to the physical refining of the bleached oil need not be increased with respect to the amount used in bleaching alkali refined oil produced from the same crude oil, which also improves the economics of the process of the invention.

The acid to be dispersed in the water degummed oil must be one which forms salts or complexes with the metal ions resulting from the decomposition of the metal salts present in the water degummed oil which salts or complexes are poorly ionized in water. Similarly these salts or complexes must not be oil-soluble.

In practice, phosphoric acid, citric acid, oxalic acid and tartaric acid have been found to fulfill these criteria but this list is by no means exhaustive.

Acid strength and concentration are chosen such that the pH of the acid solution brings about almost complete decomposition of the metal salts present in the water degummed oil. Thus for phosphoric acid an acid strength in the range of 20 to 60 wt % is preferred. Further, phosphoric acid of this strength is preferably used in an amount of 0.4 to 2.0 wt % of the oil. Water and concentrated acid may be added separately to the water degummed oil, but may also be added as already diluted acid to either dry or wet oil, provided the final overall concentration is kept within specified limits.

The amount of diluted acid to be used, the degree of dispersion and the contact time all affect the extent of decomposition of the metal salts in the water degummed oil. For cost reasons, as low an amount of diluted acid as possible will be preferred as well as a short contact time. This makes the degree of dispersion of the diluted acid into the water degummed oil of paramount importance. It has been found that dispersing 0.1 vol % phosphoric acid (89 wt %) and 0.6 vol % water with a magnetic stirrer in the laboratory or with a rotary mixer on an industrial scale and allowing a contact time of 2 minutes did not always lead to complete removal of NHP whereas when a high shear mixer like an Ultra Turrax ® was used as a means of dispersion instead, very low residual phosphorus levels were invariably observed.

In order to quantify the degree of dispersion, several dispersions have been studied with a Centrifugal Automatic Particle Analyzer (Horiba CAPA 500). In this instrument the dispersion is subjected to centrifugal gravitation as a result of which the dispersed droplets sink to the bottom of a cuvette with a rate governed by their diameter (and the viscosity of the oil and the difference in density between dilute acid and oil). By measuring the change in light absorption by the dispersion in the cuvette as a function of time a particle size distribution of the droplets and the number of droplets per gram of oil can then be calculated.

As a result of these measurements it can be concluded that as a minimum 10 million droplets of aqueous acid per gram of oil are required to allow sufficient decomposition of the metal salts in the water degummed oil. In other words a minimum interface between dilute acid droplets and the oil is required and the aforementioned amount of droplets of aqueous acid correspond to a minimum of 0.2 $m^2$ interface between dilute acid droplets and the oil per 100 g of oil.

According to the process of the invention contact times between the dilute acid droplets and the water-degummed oil of not more than 5 minutes and preferably about 2 to 3 minutes are sufficient for obtaining the desired degree of decomposition of the metal salts in the water-degummed oil. Of course, the necessary amount of aqueous acid droplets per gram oil depends to a certain extent upon the contact time so that with longer contact periods also dispersions with less than 10 million aqueous acid droplets per gram of oil may lead to acceptable results. However, increasing the contact time worsens the economics of the process according to the invention which is undesirable.

The base to be added to the acid-in-oil dispersion in the second stage of the process can be caustic soda but other bases such as sodium silicate, soda ash and even solid ones such as calcium carbonate can be used. The minimum amount of base to be used for the removal of the NHP to be effective is such that the pH of the aqueous phase in the oil is raised to at least 2.5. The maximum amount of base to be used is determined by the amount of soaps that are tolerated in the gums separated in the third stage of the process. If the pH is raised above 7.0 these gums will contain appreciable amounts of soaps that complicate subsequent treatment and purification of the phosphatidic acid rich gums.

For the phosphatidic acid rich gums to have optimal emulsifying properties, a pH range after the addition of the base of 5–7, preferably 6.0–6.5 should be aimed at, at least when phosphoric acid is used in the first stage of the process. When citric acid is used in the first stage of the process the pH range is less critical for the emulsifying properties of the phosphatidic acid rich gums. The reason for this difference is not clear but there are indications that phosphoric acid forms a complex with phosphatidic acid, which complex falls apart in the preferred pH range and that no such complex is formed with citric acid.

The amount of water to be used in the second stage of the process is not critical for the effective removal of NHP from water degummed oil and is mainly determined by the separation equipment used in the third stage of the process. Too little water may lead to a sticky gum that can clog the transport system of the separator; too much water necessitates the removal of this large amount of water when processing the gum layer. In practice, a total amount of 2.5 wt % of water calculated on the oil to be degummed leads to efficient degumming but a range of 1–5 wt % can be used.

The temperature of the oil during the degumming process has been found not to be critical. In laboratory experiments it has been kept below 95° C. in order to avoid water evaporation but industrially, higher temperatures are permissible if a closed system, operating at superatmospheric pressure is used.

The gums separated in the third stage of the process constitute a valuable product with interesting emulsifying properties. As with lecithin, the product resulting from water degumming of crude oils, it is advisable to dry the gum layer to avoid it going mouldy. Thin layer evaporators can be used for this purpose.

Analysis of the evaporation residue by two-dimensional thin layer chromatography followed by quantitative phosphorus analysis of the spots, shows a high content of phosphatidic acid. Whereas in normal lecithin this is usually less than 10% of the phosphatides present, in the gums separated in the third stage of the process according to the invention, the phosphatidic acid is usually above 30% and values as high as 80% (based on total phosphatides) have been observed. Lysophosphatidic acid is also present in larger concentration than in normal lecithin.

The following Examples describing preferred embodiments and comparative tests are given for illustrative purposes only and are not meant to be a limitation on the subject invention. In all cases, unless otherwise noted, all parts and percentages are by weight.

EXAMPLE 1

An amount of 300 g water degummed soy bean oil with a residual phosphorus content of 114 ppm was heated in a 600 ml beaker on a hot plate with magnetic stirrer to a temperature of approximately 90° C. The water content of the oil was raised to 0.6 wt % by the addition of demineralized water which was dispersed through the oil by the magnetic stirrer.

Subsequently 0.1 vol % of concentrated (89 wt %) phosphoric acid was added to the oil, whereupon the mixture was homogenized for 30 seconds with an Ultra Turrax ® (manufacturer: Janke & Kunkel KG, IKA Werk, D-8713 Staufen, West Germany; type: T 45; turbine G 6) at a speed approximately 10,000 rpm. The emulsion thus obtained was agitated for a further 3 minutes with the magnetic stirrer whereupon 2 vol % of a dilute (5 wt %) caustic soda solution was added to attain pH 6.8.

After a further 3 minute period of agitation the mixture was transferred into centrifugal tubes and centrifuged for 30 minutes at 5,000 rpm corresponding to 4080 g, thus achieving a separation between the oil and the neutralized phosphoric acid. The rotor of the centrifuge had been preheated so that the oil temperature did not fall below 45° C. during centrifuging.

The top oil layer was decanted into a 600 ml beaker and heated under magnetic agitation to 90° C. and 2 wt % of demineralized water were added to wash the oil. The washing water was removed by centrifuging, again at 5000 rpm for 30 minutes whereupon the washed oil was decanted into a round bottom flask and dried under vacuum as provided by a water aspirator.

The dry, intensively degummed oil thus obtained was analysed for phosphorus and other trace elements by plasma emission spectroscopy (A. J. Dijkstra and D. Meert, J.A.O.C.S. 59, 199 (1982)). A residual phosphorus content of 5.3 ppm was determined and the iron content had decreased from the initial value of 0.71 ppm to 0.04 ppm.

EXAMPLE 2

In order to avoid soap formation during neutralization of the acid used in the intensive degumming process, the acid/caustic ratio was varied. The procedure of Example 1 was repeated but sunflower oil was used instead and the amount of phosphoric acid was increased to 0.15 vol %.

The intensively degummed oil was analysed for phosphorus, iron and soap.

| amount of 7.5 wt % caustic (vol %) | % acid neutralized | residual phosphorus (ppm) | residual iron (ppm) | soap content (ppm) | pH |
|---|---|---|---|---|---|
| 0.8 | 22.3 | 11.3 | 0.16 | 0 | 2.0 |
| 1.0 | 27.9 | 3.9 | 0.12 | 0 | 2.4 |
| 1.2 | 33.4 | 7.0 | 0.15 | 0 | 3.4 |
| 1.4 | 39.1 | 4.5 | 0.11 | 0 | 5.4 |
| 1.6 | 44.6 | 3.3 | 0.13 | 0 | 6.0 |
| 1.8 | 50.2 | 7.9 | 0.13 | 25.0 | 6.8 |
| 2.0 | 55.7 | 7.2 | 0.10 | 15.6 | 7.2 |
| 2.2 | 61.3 | 12.8 | 0.24 | 94.5 | 7.9 |

These experiments indicate that the degree of neutralization can be varied within wide limits and that nevertheless a virtually soap free oil with low residual phosphorus and iron content can result.

Such an oil was bleached with 0.5 wt % bleaching earth at 120° C. under vacuum for 30 minutes whereupon the oil was allowed to cool to below 90° C. before the bleaching earth was filtered off. Subsequently, the bleached oil was physically refined at 240° C. for 2 hours at a vacuum below 3.0 mm Hg.

The oil thus obtained had a bland neutral taste and showed the same keepability as chemically neutralized sunflower oil based upon the same crude oil.

EXAMPLE 3

Crude water degummed soy bean oil was heated according to the method described in Example 1 but in a comparative experiment the caustic used for the neutralization of the phosphoric acid was replaced by demineralized water. The temperature to which the oil was heated was also varied.

| | | Initial concentration | | Concentration after degumming | |
|---|---|---|---|---|---|
| Temperature °C. | Caustic/ Water | phosphorus (ppm) | iron (ppm) | phosphorus (ppm) | iron (ppm) |
| 90 | Caustic | 114 | 0.71 | 5.3 | 0.04 |
| 90 | Water | 150 | 1.02 | 63.5 | 0.12 |
| 75 | Caustic | 114 | 0.71 | 3.9 | 0.03 |
| 75 | Water | 150 | 1.02 | 34.8 | 0.12 |

The table shows that neutralization leads to lower residual levels of phosphorus and iron than sheer dilution of the phosphoric acid by water. If therefore the intensive degumming process is to be followed by physical refining, at least partial neutralization of the degumming acid is to be preferred, although even the oil with water dilution yielded a good quality oil provided the bleaching earth level was raised to 1.5 wt %. The table also shows that the temperature used during intensive degumming is not very critical.

EXAMPLE 4

In order to investigate the influence of the amount of acid and acid strength a number of experiments were carried out using the method described in Example 1, on a water degummed sunflower oil with 50.4 ppm phosphorus and 2.07 ppm iron. The phosphoric acid used was concentrated phosphoric acid (89 wt %) and the percentage acid neutralized was 55.7% in each case.

| water (wt %) | phosphoric acid (vol %) | acid conc. aqueous phase (wt %) | residual phosphorous (ppm) | residual iron (ppm) |
|---|---|---|---|---|
| 5.0 | 0.10 | 3.0 | 19.6 | 1.00 |
| 2.5 | 0.10 | 5.8 | 11.6 | 0.91 |
| 2.0 | 0.10 | 7.2 | 11.9 | 0.54 |
| 1.5 | 0.10 | 9.3 | 8.2 | 0.38 |
| 1.2 | 0.10 | 11.3 | 6.6 | 0.33 |
| 0.6 | 0.05 | 11.3 | 11.5 | 0.33 |
| 0.9 | 0.10 | 14.5 | 8.1 | 0.25 |
| 0.6 | 0.10 | 20.1 | 6.6 | 0.19 |
| 0.6 | 0.15 | 27.1 | 4.7 | 0.10 |
| 0.3 | 0.10 | 32.8 | 10.3 | 0.16 |
| 0.6 | 0.20 | 32.8 | 6.5 | 0.25 |
| 0.6 | 0.25 | 37.5 | 3.0 | 0.17 |
| 0.6 | 0.30 | 41.3 | 2.5 | 0.12 |
| 0.6 | 0.35 | 45.1 | 2.0 | 0.12 |
| 0.6 | 0.40 | 47.9 | 3.9 | 0.12 |
| 0.6 | 0.50 | 52.6 | 6.1 | 0.12 |
| 0.6 | 0.60 | 56.6 | 7.9 | 0.12 |
| 0.6 | 0.80 | 62.3 | 6.6 | 0.12 |
| 0.6 | 0.90 | 64.3 | 36.0 | 0.07 |
| 0.6 | 1.00 | 66.3 | 48.4 | 0.18 |
| 0.6 | 1.50 | 72.3 | 59.1 | 0.14 |
| 0.6 | 2.00 | 76.0 | 36.7 | 0.17 |
| — | 0.60 | 89.0 | 134.0 | 0.07 |
| — | 0.10 | 89.0 | 70.7 | 0.53 |

Apparently, a low acid strength is ineffective in assuring phosphorus and iron removal and too high a strength leads to incomplete phosphorus removal although iron removal is less affected. For phosphoric acid the optimal strength is from 20-60 wt % but, as illustrated by this Example, concentrations outside this range can be tolerated.

In a process variant, phosphoric acid of 20.1 wt % concentration was added to the oil instead of adding the water first and the acid subsequently. This also caused the oil to be intensively degummed in that the residual phosphorus and iron levels were found to be 8 ppm and 0.14 ppm, respectively. The same experiment using phosphoric acid of 37.5 wt % concentration resulted in 6.4 ppm residual phosphorus and 0.08 ppm iron.

EXAMPLE 5

Although phosphoric acid is the preferred acid because of food law regulations and cost, other acids can also be used in the intensive degumming process and are similarly effective, provided their metal salts are not oil-soluble as for instance acetates. The water degummed sunflower oil used in Example 4 was treated with a number of acids in the amounts and concentrations tabulated below.

| type acid | acid strength | amount water (wt %) | amount acid (vol %) | residual phosphorus (ppm) | residual iron (ppm) |
|---|---|---|---|---|---|
| phosphoric | 85 wt % | 0.6 | 0.15 | 7.2 | 0.10 |
| acetic | >99 wt % | 0.33 | 0.42 | 29.5 | >2.00 |
| sulphuric | 96 wt % | 0.55 | 0.20 | 16.2 | 0.31 |
| citric | 640 g/l | — | 0.72 | 3.5 | 0.07 |
| oxalic | 600 g/l | — | 0.75 | 8.6 | 0.13 |
| tartaric | 1000 g/l | 0.20 | 0.54 | 5.8 | 0.19 |

EXAMPLE 6

Besides caustic soda other bases can be used as illustrated in this example. The water degummed sunflower oil used in Example 4 was treated according to the general method as described in Example 1 but the amount of concentrated phosphoric acid used was 0.15 vol %.

| type base | concentration (wt %) | amount added (vol %) | residual phosphorus (ppm) | residual iron (ppm) |
|---|---|---|---|---|
| caustic soda | 7.5 | 2 | 4.7 | 0.10 |
| soda ash | 10.0 | 2 | 5.8 | 0.17 |
| lime | 2 | 10 | 13.3 | 0.13 |
| water glass | 18 | 2 | 5.7 | 0.13 |

EXAMPLE 7

Several crude oils were treated according to the method as described in Example 1. The phosphorus contents of these oils before and after water degumming and after undergoing the second stage of the process according to the invention are given in the table below together with the amount (vol %) of phosphoric acid (89 wt %) used.

| | phosphorus content (ppm) | | | Phos- |
|---|---|---|---|---|
| oil | before water degumming | after water degumming | after 2nd stage degumming | phoric acid (vol %) |
| sunflower oil | 138 | 54 | 7.1 | 0.10 |
| soy bean oil | 875 | 114 | 6.5 | 0.10 |
| ground nut oil | 130 | 80 | 5.2 | 0.10 |
| corn germ oil | 547 | 22 | 6.4 | 0.15 |
| rape seed oil | 119 | 119 | 6.1 | 0.20 |

EXAMPLE 8

The effect of the degree of dispersion of the non-toxic acid in the water degummed oil and more in particular the number of aqueous acid droplets per gram of oil and correspondingly the surface area of the acid/oil-interface was investigated using a magnetic stirrer and an Ultra Turrax ® mixer in laboratory experiments and by using a static mixer and a rotative mixer in industrial trials.

Samples of the dispersion were studied for particle size distribution using the Centrifugal Automatic Particle Analyzer (Horiba CAPA 500) with the following input parameters;

Solvent viscosity: 46.00 cp
Solvent density: 0.91 g/ml
Sample density: 1.23 g/ml
Centrifuge speed: 3.000 rpm
Maximum diameter: 30 micron
Diameter divisions: 2 micron.

If microscopic examination of the dispersion revealed the presence of larger droplets, the input parameters were changed accordingly. Using the average particle diameter and its frequency, a surface area per interval was calculated whereafter the total surface area of the acid-in-oil interface and the number of aqueous acid droplets per gram of oil were calculated.

Using water degummed soy bean oil with a water content of 0.05 wt % to which 0.30 wt % of water and 0.15 vol % of phosphoric acid were added the following numbers of dilute acid droplets per gram of oil and total surface areas were determined:

| | droplets per g oil | acid/oil interface |
|---|---|---|
| Magnetic stirrer | 110 million | 0.35 $m^2$/100 g |
| Ultra Turrax ® | 485 million | 0.75 $m^2$/100 g |

-continued

| | droplets per g oil | acid/oil interface |
|---|---|---|
| Static mixer | 0.1 million | 0.10 $m^2$/100 g |
| Rotative mixer | 80 million | 0.37 $m^2$/100 g |

After a contact time of approximately 2.5 minutes the dispersed aqueous phosphoric acid was neutralized to about 55.7% whereafter the gums were removed and the oil was washed with water. The table below shows the phosphorus contents (ppm) of several oils at the various stages as function of the method of acid dispersion.

| method of dispersion | crude oil | water degummed crude oil | degummed acc. invention |
|---|---|---|---|
| magnetic stirrer | 594 | 87 | 8.9 |
| magnetic stirrer | 136 | 49 | 13.4 |
| Ultra Turrax ® | 567 | 83 | 4.7 |
| Ultra Turrax ® | 193 | 69 | 3.9 |
| static mixer | — | 51 | 25–33 |
| rotative mixer | 639 | 104 | 7.6 |
| rotative mixer | 146 | 41 | 14.2 |

This table shows that 0.1 million aqueous acid droplets per gram of oil or a total surface area of the acid-/oil-interface of 0.1 $m^2$/100 g, respectively, is insufficient to achieve a sufficiently low phosphorus content of the oil degummed according to the process of the invention using about 0.5 vol % of dispersed aqueous acid and a contact time of 2.5 minutes. From the above and all other laboratory experiments and industrial trials it can be expected that 10 million aqueous acid droplets per gram of oil is the minimum value for the process according to the invention to be effective. Correspondingly the acid/oil-interface should be at least about 0.2 $m^2$/100 g. More preferred values for the number of aqueous acid droplets per gram of oil are more than 100 million and particularly more than 300 million per gram of oil.

EXAMPLE 9

The phospholipid composition of the gums separated in the third stage of the process according to the invention was analysed for several vegetable oils. The gums were separated according to Example 1 and washed in the centrifuge tubes with a 50 wt % citric acid solution in order to remove inorganic phosphates. The gum layer was subsequently freeze dried and extracted with hexane to remove inorganics present. The resulting phospholipids were analyzed by two-dimensional thin layer chromatography using activated silica gel as stationary phase. The solvent mixtures used were chloroform/methanol/28% ammonia (65:40:5) and chloroform/acetone/methanol/acetic acid/water (50:20:10:15:5). Spot identification was by using samples of pure phospholipids and quantitative data were obtained by scraping the spots and analysing for phosphorus (Lipids 5.494–496, 1970). These data were subsequently corrected to phospholipid composition by use of their individual molecular weights.

The following table gives the phospholipid composition of several gums as weight percentages.

| oil | A | B | C | D | E |
|---|---|---|---|---|---|
| phosphorus content | 187 | 110 | 23 | 132 | 16 |

-continued

| oil | A | B | C | D | E |
|---|---|---|---|---|---|
| after water degumming (ppm) | | | | | |
| phosphatidic acid | 55 | 49 | 37 | 72 | 53 |
| lysophosphatidic acid | 6 | 20 | — | 6 | — |
| phosphatidyl choline | 4 | 8 | 26 | <1 | 15 |
| lysophosphatidyl choline | <1 | — | — | | |
| phosphatidyl ethanolamine | 17 | 9 | 13 | 13 | 7 |
| lysophosphatidyl ethanolamine | <1 | 5 | | 2 | |
| cardiolipin | | | | | |
| N—acylphosphatidyl ethanolamine | 13 | 9 | 19 | 7 | 24 |
| phosphatidyl inositol | 4 | — | 5 | — | |
| unidentified | — | — | | — | |

A = soy bean oil
B = sunflower oil
C = corn germ oil
D = rape seed oil (low erucic acid)
E = groundnut oil The table shows low erucic acid rape seed oil to be a very good source of phosphatidic acid because the phospholipid content of the water degummed oil is fairly high as is its phosphatidic acid content. Corn oil and groundnut oil yield very little phosphatidic acid and soy bean oil and sunflower oil occupy intermediate positive. Phosphorus content of water degummed oil and its phospholipid composition can, however, vary considerably between lots.

EXAMPLE 10

In this example the use of the gums obtained in the third stage of the process according to the invention as suitable emulsifier for e.g. calf milk replacers is illustrated. According to the test method used, 47 g of beef tallow, 3 g emulsifier and about 5 mg Sudan red are heated to 50° C. and mixed with 400 ml water of 40° C. for exactly 2 minutes with a high shear mixer, namely a Kinematica mixer PTA 35/4 at 6000 rpm. The emulsion is then transferred to a measuring cylinder of 500 ml whereupon the height of the red layer of supernatant fat is measured every 10 minutes. An emulsifier has to meet the following criteria to be regarded as acceptable for this application: after 30 minutes the volume of the supernatant fat layer may not exceed 7.5 ml and after 60 minutes it may not exceed 15 ml.

Using a gum isolated from soy bean oil according to Example 1 whereby the amount of caustic soda was such that a pH of 6.3 was obtained after the second stage of the process, the volume of the supernatant fat layer in this creaming test was observed to be 5 ml after 30 minutes and 9 ml after 60 minutes, indicating that the gum layer was fully acceptable. Analysis of this gum layer showed that its phosphatidic acid content accounted for 48.3% of the total phospholipids present and its lysophosphatidic acid content for 6.8%.

We claim:

1. A process for producing degummed vegetable oils and gums of high phosphatidic content by removing non-hydratable phosphatides and iron from water degummed vegetable oils comprising the following stages:

(a) in a first stage, finely dispersing a non-toxic agueous acid in the water degummed oil, said acid being selected from the group consisting of phosphoric aicd, citric acid, oxalic acid and tartaric acid, the degree of dispersion being at least such that 10 million droplets of said aqueous acid per gram of oil are present and the contact time of said aqueous acid with said water degummed oil being sufficient to complete the decomposition of the metal salts of phosphatidic acid, (b) in a second state, mixing a base into the acid-in-oil dispersion in such quantity that the pH of the aqueous phase is increased to above 2.5 without any substantial amount of soap being produced, said base being selected from the group consisting of caustic soda, sodium silicate, soda ash and calcium carbonate; and (c) in a third stage, separating the dispersion into an aqueous phase containing said gums and an oil phase consisting of acid oil, said oil phase optionally being washed with water.

2. A process for producing degummed vegetable oils and gums of high phosphatidic content by removing non-hydratable phosphatides and iron from water degummed vegetable oils comprising the following stages:

(a) in a first stage, finely dispersing a non-toxic aqueous acid in the water degummed oil, the degree of dispersion being at least such that 10 million droplets of said aqueous acid per gram of oil are present and the contact time of said aqueous acid with said water degummed oil being sufficient to complete the decomposition of the metal salts of phosphatidic acid, said acid (1) being one that forms oil-insoluble salts or complexes with the metal ions resulting from the decomposition of said metal salts and (2) having a strength and concentration such that the pH of the acid solution effects essentially complete decomposition of said metal salts, (b) in a second stage, mixing a base into the acid-in-oil dispersion in such quantity that the pH of the aqueous phase is increased to above 2.5 without any substantial amount of soap being produced; and (c) in a third stage, separating the dispersion into an aqueous phase containing said gums and an oil phase consisting of acid oil, said oil phase optionally being washed with water.

3. Process according to claim 2, wherein the degree of dispersion in the first stage is at least such that 100 million droplets aqueous acid per gram of oil are present.

4. Process according to claim 2, wherein the degree of dispersion in the first stage is at least such that 300 million droplets aqueous acid per gram of oil are present.

5. Process according to claim 2, wherein the nontoxic acid used is aqueous phohphoric acid.

6. Process according to claim 5 wherein the strength of the aqueous phosphoric acid is 20–60 wt %.

7. Process according to claim 6, wherein the amount of aqueous phosphoric acid is 0.4–2.0 wt % of the oil.

8. Process according to claim 2, wherein concentrated non-toxic acid and water are added separately to the oil in the first stage of the process.

9. Process according to claim 5, wherein the pH of the aqueous phase after the addition of the base in the second stage of the process is 5–7.

10. Process according to claim 2, wherein the total amount of water present at the end of the second stage of the process is not more than 5 wt % of the oil.

11. Process according to claim 2, wherein the contact time allowed for in the first stage of the process is not more than 5 minutes.

12. Process according to claim 2, wherein separation of the aqueous phase containing the gums and the oil phase consisting of acid oil is carried out immediately after a base is mixed into the acid-in-oil dispersion in the second stage without allowing for any considerable contact time for the development of the gums.

13. Process according to claim 2, wherein the aqueous phase separated in the third stage of the process is processed to recover at least part of the phosphatides derived from the non-hydratable phosphatides contained in the starting water degummed oil.

14. Phosphatides with a higher level of phosphatidic acid than lecithin as obtained by water degumming of crude vegetable oil obtained by the process according to claim 13.

15. Phosphatides according to claim 14, wherein the phosphatidic acid content, based on total phosphatides, is above 30 wt %.

* * * * *